United States Patent [19]
Fey et al.

[11] Patent Number: 5,977,191
[45] Date of Patent: Nov. 2, 1999

[54] METHOD FOR CONTROLLING FOAM

[75] Inventors: Kenneth Christopher Fey; James Habermehl, both of Midland, Mich.

[73] Assignee: Dow Corning Corporation, Midland, Mich.

[21] Appl. No.: 09/235,208

[22] Filed: Jan. 22, 1999

Related U.S. Application Data

[62] Division of application No. 08/635,346, Apr. 19, 1996, Pat. No. 5,908,891.

[51] Int. Cl.$^6$ ........................................... B01D 19/04
[52] U.S. Cl. ........................... 516/117; 516/122; 516/123
[58] Field of Search ..................................... 516/117, 122, 516/123

[56] References Cited

U.S. PATENT DOCUMENTS 5,908,891   6/1999   Fey et al. ................................. 524/491

*Primary Examiner*—Margaret G. Moore
*Attorney, Agent, or Firm*—Tmithy J. Troy

[57] ABSTRACT

The present invention relates to a method for controlling foam in a foam producing system comprising adding to the foam producing system a dispersible silicone composition comprising (I) a silicone composition prepared by reacting (i) a polyorganosiloxane, (ii) a silicon compound, optionally (iii) a finely divided filler, and (iv) a catalytic amount of a compound for promoting the reaction of the other components and (II) a hydrocarbon oil. The hydrocarbon oil is effective as a dispersing agent for the silicone composition (I). The hydrocarbon oil-containing compositions are easier to handle, and produce less waste and its dispersion into mineral oil based formulations is more efficient.

21 Claims, No Drawings

METHOD FOR CONTROLLING FOAM

CROSS-REFERENCE TO RELATED APPLICATIONS

This is a divisional of Ser. No. 08/635,346, filed Apr. 19, 1996, now U.S. Pat. No. 5,908,891.

BACKGROUND OF THE INVENTION

This invention relates to dispersible silicone compositions. More particularly, this invention relates to dispersible silicone compositions comprising a blend of a silicone composition and mineral oil.

The use of various silicone containing compositions as antifoams or defoamers is known. In this regard, it is well established that this art is highly unpredictable and slight modification can greatly alter performance of such compositions. Most of these compositions contain silicone fluid (usually dimethylpolysiloxane), often in combination with small amounts of silica filler. Additionally, these compositions may include various surfactants and dispersing agents in order to impart improved foam control or stability properties to the compositions.

Silicone compositions which are useful as foam control agents have been taught in the art. For example, Aizawa et al., in U.S. Pat. Nos. 4,639,489 and 4,749,740, the disclosures of which are hereby incorporated by reference, teach a method for producing a silicone defoamer composition wherein a complex mixture of polyorganosiloxanes, filler, a resinous siloxane and a catalyst to promote reaction of the other components are heated together at 50° C. to 300° C.

More recently, a method for preparing a composition similar to that described by Aizawa et al., cited supra, was disclosed by Miura in U.S. Pat. No. 5,283,004, the disclosure of which is hereby incorporated by reference. In this disclosure, the above mentioned complex silicone mixture additionally contains at least 0.2 weight parts of an organic compound having at least one group selected from —COR, —COOR' or —(OR")$_n$—, wherein R and R' are hydrogen or a monovalent hydrocarbon group, R" is a divalent hydrocarbon group having 2 to 6 carbon atoms and the average value of n is greater than one. It is further disclosed that all the ingredients, including a catalyst, must be reacted at elevated temperatures to obtain the desired antifoam agent.

John et al., in European Patent Application No. 217,501, published Apr. 8, 1987, discloses a foam control composition which gives improved performance in high foaming detergent compositions which comprises (A) a liquid siloxane having a viscosity at 25° C. of at least 7×10$^{-3}$ m$^2$/s and which was obtained by mixing and heating a triorganosiloxane-endblocked polydiorganosiloxane, a polydiorganosiloxane having at least one terminal silanol group and an organosiloxane resin, comprising monovalent and tetravalent siloxy units and having at least one silanol group per molecule, and (B) a finely divided filler having its surface made hydrophobic. John et al. further describes a method for making the foam control compositions and detergent compositions containing said foam control compositions.

Starch, in U.S. Pat. No. 4,983,316 discloses a dispersible antifoam composition for providing controlled foaming liquid laundry detergent formulations and wherein there is provided a non-aqueous emulsion of primary and secondary silicone antifoam agents, at least one nonionic silicone surfactant for emulsifying the primary and secondary antifoaming agents in a solvent, a first organic surfactant dispersing agent for assisting in dispersing the emulsified primary and secondary antifoaming agents in the liquid laundry detergents, and a second dispersing agent of a nonionic difunctional block-copolymer terminating in primary hydroxyl groups for further assisting in dispersing the emulsified primary and secondary antifoam agents in the liquid laundry detergent. A liquid laundry detergent composition containing the composition described immediately above is also disclosed. Starch, in U.S. Pat. No. 4,978,471 discloses a composition which contains essentially the same components as in the '316 patent, however in the '471 patent the secondary antifoam agent is a blend of a polydimethylsiloxane substituted with polar groups and a polydimethylsiloxane fluid.

Terae et al., in U.S. Pat. No. 4,690,713, discloses an antifoam composition comprising (a) 100 parts by weight of a hydrocarbon oil, such as a spindle oil or silicone fluid (e.g. a polydimethylsiloxane fluid having a viscosity of 20 to 1,000,000 centistokes at 25° C., (b) 0.1 to 40 parts by weight of an organosilane compound having 1 to 3 hydroxy groups or hydrolyzable groups (such as alkoxy, acyloxy, and alkenyloxy groups), (c) 1 to 40 parts by weight of a finely divided silica powder and optionally a catalyst.

Foam control compositions which contain mineral oil have also been disclosed. For example, in Great Britain Patent Specification No. 1224026 is disclosed a process for inhibiting or destroying foam in an aqueous system which comprises adding to the aqueous system an antifoaming agent which is composed of (A) 10 parts by weight of a water insoluble organic liquid which can be a mineral oil and (B) from 0.1 to 5.0 parts by weight of an organopolysiloxane which is compatible in (A) consisting essentially of (1) SiO$_2$ units and (2) R$_3$SiO$_{1/2}$ units in which R is a monovalent hydrocarbon radical containing from 1 to 6 inclusive carbon atoms, and in which the ratio of (1) units to (2) units is within the range from 0.6/1 to 1.2/1.

Keil, in U.S. Pat. No. 3,666,681 discloses an antifoaming agent for aqueous systems consisting essentially of a mixture of (A) 100 parts by weight of a water insoluble organic liquid or solid which can be a mineral oil, (B) from 0.5 to 10 parts by weight of an organopolysiloxane compound selected from the group consisting of a hydroxyl terminated dimethylpolysiloxane fluid having a viscosity of at least 35 centistokes at 25° C. and a benzene soluble organopolysiloxane resin comprising (1) R$_3$SiO$_{1/2}$ units and (2) SiO$_2$ units in which R is a monovalent hydrocarbon radical containing from 1 to 6 carbon atoms inclusive, and in which the ratio of (1) units to (2) units is from 0.6:1 to 1.2:1, (C)/from 0.5 to 10 parts by weight of a filler such as finely divided silica, (D) from 0.002 to 5 parts by weight of a compound which is a hydrocarbon amine, ammonia, a disilazane, or a compound of the formula R'OH in which R' is an alkali of alkaline earth metal.

Great Britain Patent Specification No. 1496011 discloses a composition suitable for use in an oil-based defoamer consisting essentially of (1) from 55 to 96 percent by weight of a siloxane having the unit formula CH$_3$Si(OCH$_3$)$_x$O$_{3-x/2}$ in which x is such that there is from 10 to 35 percent by weight of methoxy groups based on the weight of (1), (2) from 2 to 25 percent by weight of a hydrocarbon solvent soluble copolymer of (CH$_3$)$_3$SiO$_{1/2}$ units and SiO$_2$ units in which the ratio of (CH$_3$)$_3$SiO$_{1/2}$ units to SiO$_2$ units is in the range of 0.5/1 to 1.2/1, and (3) from 2 to 25 percent by weight of a silicon-bonded hydroxyl terminated methylpolysiloxane fluid. This reference further discloses a defoaming composition for aqueous systems comprising a composition prepared by mixing (A) 100 parts by weight of a mineral oil, (B) 3 to 20 parts by weight of the above composition, and (C) a condensation catalyst for (B), and thereafter heating the mixture at a temperature of at least 50° C. unit an effective defoamer is obtained.

Rauline in U.S. Pat. No. 4,564,467 discloses an oil composition comprising an oil having a kinematic viscosity of 5 to 30 centistokes at 25° C., and a long-chain alkyl organosiloxane.

SUMMARY OF THE INVENTION

It has now been discovered that mineral oils are effective dispersing agents for silicone compositions such as those disclosed by Aizawa et al., cited supra.

It is an object of the present invention to prepare silicone compositions which can be advantageously utilized to control foam in foam producing systems.

It is a further object of the present invention to provide silicone compositions wherein there is provided improvement in the control of foaming behavior.

It is a further object of the present invention to provide silicone compositions which are stable and easily dispersible.

DETAILED DESCRIPTION OF THE INVENTION

The present invention relates to a dispersible silicone composition comprising a blend of (I) a silicone composition prepared by reacting at a temperature of 50° C. to 300° C. a mixture comprising: (i) 100 parts by weight of at least one polyorganosiloxane selected from (A) a polyorganosiloxane having a viscosity of about 20 to 100,000 mm$^2$/s at 25° C. and being expressed by the general formula $R^1{}_a SiO_{(4-a)/2}$ in which $R^1$ is a monovalent hydrocarbon or halogenated hydrocarbon group having 1 to 10 carbon atoms and a has an average value of 1.9 to 2.2, (B) a polyorganosiloxane having a viscosity of 200 to about 100 million mm$^2$/s at 25° C. expressed by the general formula $R^2{}_b(R^3O)_c SiO_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of 1.9 to 2.2 and c has a sufficiently large value to give at least one —OR$^3$ group in each molecule, at least one such —OR$^3$ group being present at the end of the molecular chain, or (C) a mixture of (A) and (B); (ii) 0.5 to 20 parts by weight of at least one silicon compound selected from (a) an organosilicon compound of the general formula $R^4{}_d SiX_{4-d}$ in which $R^4$ is a monovalent hydrocarbon group having 1 to 5 carbon atoms, X is selected from a halogen atom or a hydrolyzable group and d has an average value of one or less, (b) a partially hydrolyzed condensate of said compound (a), (c) a siloxane resin comprising (CH$_3$)$_3$SiO$_{1/2}$ units and SiO$_{4/2}$ units wherein the ratio of (CH$_3$)$_3$SiO$_{1/2}$ units to SiO$_{4/2}$ units is 0.4:1 to 1.2:1, or (d) a condensate of said compound (c) with said compound (a) or (b); and (iii) a catalytic amount of a compound for promoting the reaction of components (i) and (ii); and (II) mineral oil.

The compositions of this invention comprise silicone composition (I) and mineral oil (II). Component (I) of the present invention can be prepared by reacting (i) a polyorganosiloxane, (ii) a silicon compound, and (iii) a catalytic amount of a compound for promoting the reaction of the other components.

Component (i) may be selected from (A) polyorganosiloxanes comprising siloxane units of the general formula $R^1{}_a SiO_{(4-a)/2}$ and having a viscosity of 20 to 100,000 mm$^2$/s (centistokes (cS)) at 25° C. The organo groups $R^1$ of the polyorganosiloxane (A) are the same or different monovalent hydrocarbon or halogenated hydrocarbon groups having one to ten carbon atoms. Specific examples thereof are well known in the silicone industry and include methyl, ethyl, propyl, butyl, octyl, trifluoropropyl, phenyl, 2-phenylethyl and vinyl groups. The methyl group is particularly preferred. In the above formula, a has a value of 1.9 to 2.2. It is particularly preferred that polyorganosiloxane (A) is a trimethylsilyl-terminated polydimethylsiloxane having a viscosity of about 350 to 15,000 mm$^2$/s at 25° C.

Alternatively, component (i) may be selected from (B) polyorganosiloxanes comprising siloxane units of the general formula $R^2{}_b(R^3O)_c SiO_{(4-b-c)/2}$ and having a viscosity of 200 to 100 million centistokes at 25° C. wherein $R^2$ is independently selected from the monovalent hydrocarbon or halogenated hydrocarbon groups designated for group $R^2$, $R^3$ is a hydrogen atom or $R^2$, and the —OR$^3$ group is present at least at the end of a molecular chain of the polyorganosiloxane. The value of b is between 1.9 to 2.2 and c has a value so as to provide at least one —OR$^3$ group per molecule. It is particularly preferred that polyorganosiloxane (B) is a hydroxyl-terminated polydimethylsiloxane having a viscosity of about 1,000 to 50,000 mm$^2$/s at 25° C. Component (i) may also be (C) a mixture of (A) and (B) in any proportion.

Component (ii) is at least one silicon compound selected from (a) to (d): (a) an organosilicon compound of the general formula $R^4{}_d SiX_{4-d}$ wherein $R^4$ is a monovalent hydrocarbon group having one to five carbon atoms, X is a halogen atom or a hydrolyzable group, such as —O$^5$ or —OR$^6$OR$^7$, in which R$^6$ is a divalent hydrocarbon group having one to five carbon atoms and R$^5$ and R$^7$ are each a hydrogen atom or a monovalent hydrocarbon group having one to five carbon atoms, the average value of d not exceeding 1, (b) a partially hydrolyzed condensate of the compound (a), (c) a siloxane resin comprising (CH$_3$)$_3$SiO$_{1/2}$ and SiO$_2$ units and having a (CH$_3$)$_3$SiO$_{1/2}$/SiO$_2$ ratio of 0.4/1 to 1.2/1, or (d) a condensate of the siloxane resin (c) with the compound (a) or (b). It is preferred that component (ii) is selected from either an alkyl polysilicate wherein the alkyl group has one to five carbon atoms, such as methyl polysilicate, ethyl polysilicate and propyl polysilicate, or the siloxane resin (c). Most preferably, component (ii) is either ethyl polysilicate or a siloxane resin copolymer comprising (CH$_3$)$_3$SiO$_{1/2}$ units and SiO$_2$ units in a molar ratio of approximately 0.4:1 to 1.2:1.

Component (iii) is a compound used as a catalyst for promoting the reaction of the other components. Any compound which promotes condensation reactions or rearrangement/condensation reactions is suitable as component (iii). It is preferably selected from siloxane equilibration catalysts, silanol-condensing catalysts, or a combination thereof. Catalysts suitable as component (iii) are exemplified by alkali metal hydroxides such as potassium hydroxide, sodium hydroxide, or cesium hydroxide, alkali metal silanolates such as potassium silanolate, alkali metal alkoxides such as potassium isopropoxide or potassium ethoxide, quaternary ammonium hydroxides such as beta-hydroxyethyltrimethyl ammonium hydroxide, benzyltrimethyl ammonium hydroxide, and tetramethyl ammonium hydroxide, quaternary ammonium silanolates, quaternary phosphonium hydroxides such as tetrabutyl phosphonium hydroxide and tetraethylphosphonium hydroxide, quaternary phosphonium silanolates, metal salts of organic acids such as dibutyltin dilaurate, stannous acetate, stannous octanoate, lead napthenate, zinc octanoate, iron 2-ethylhexoate, and cobalt naphthenate, mineral acids such as sulfuric or hydrochloric acid, organic acids such as acetic acid or organosulfonic acids, and ammonium compounds such as ammonium carbonate or ammonium hydroxide. It is preferred that the catalyst is selected from potassium silanolate, potassium hydroxide, or sodium hydroxide.

The mixture of (I) can further comprise up to 30 parts by weight of component (iv) a finely divided filler. The finely divided filler is exemplified by fumed, precipitated, or plasmatic $TiO_2$, $Al_2O_3$, $Al_2O_3/SiO_2$, $ZrO_2/SiO_2$, and $SiO_2$. The finely divided filler can be hydrophilic or hydrophobic. The filler can be hydrophobed during manufacture (i.e. in-situ) or independently. Various grades of silica having a particle size of several millimicrons to several microns and a specific surface area of about 50 to 1000 $m^2/g$ are commercially available and suitable for use as component (iv).

The mixture of (I) can further comprise up to 20 parts by weight of component (v), a polyorganosiloxane comprising siloxane units of the general formula $R^8_e(R^9O)_fSiO_{(4-e-f)/2}$ and having a viscosity of 5 to 200 $mm^2/s$ at 25° C. wherein $R^8$ is a monovalent hydrocarbon or halogenated hydrocarbon group having one to ten carbon atoms and $R^9$ is hydrogen or a monovalent hydrocarbon group having one to ten carbon atoms. The value of e is between 1.9 and 2.2 and f has a value so as to provide two or more —$OR^9$ groups in each molecule. It is particularly preferred that component (v) is a hydroxyl-terminated polydimethylsiloxane having a viscosity of about 10 to 100 $mm^2/s$ at 25° C. It is preferred that component (v) is added when filler (iv) is a hydrophilic silica.

A mixture of components (i), (ii), and (iii), optionally containing components (iv) and/or (v), is reacted under heat to produce the silicone composition (I), the proportions of the various components being: Component (i)—100 parts by weight; Component (ii)—0.5 to 20, preferably 1 to 7, parts by weight; Component (iii)—A catalytic amount (usually in the range of 0.03 to 1 part by weight); Component (iv), if present, —up to 30, preferably 1 to 15, and highly preferred is 5 to 15 parts by weight; Component (v), if present, —up to 20, preferably 1 to 10, parts by weight.

The proportions of components (A) and (B) used depends largely on their respective viscosities. It is preferable to use a mixture of (A) and (B) which has a viscosity of 1,000 to 100,000 $mm^2/s$ at 25° C.

The silicone composition (I) is prepared by first mixing components (i), (ii), and (iii) and heating this blend to about 110 to 120° C. Finely divided filler (iv), if desired, is then uniformly mixed in using an appropriate dispersing device, such as a homomixer, colloid mill or triple roll mill. The resulting mixture is heated at a temperature of 50° C. to 300° C., preferably 100° C. to 300° C., and reacted for one to eight hours, although the reaction time varies depending on the temperature. If component (v) is to be employed in the composition, it is generally added after the filler (iv). It is preferable to carry out all mixing and heating operations in an inert gas atmosphere in order to avoid any danger and to remove volatile matter (unreacted matter, by-products, etc.). The mixing order of the components and the heating temperature and time as hereinabove stated are not believed critical, but can be changed as required. It is further preferred that, after reaction, the catalyst is neutralized to further stabilize silicone composition (I).

Alternatively, silicone composition (I) preferably comprises a diorganopolysiloxane, a silicon compound, and a catalyst for promoting the reaction of these components, and this combination optionally containing a filler such as silica. These systems contain a mixture of a trimethylsilyl-terminated polydimethylsiloxane and a diorganopolysiloxane having silicon-bonded hydroxyl groups or silicon-bonded alkoxy groups along its main chain or at its chain ends, said alkoxy groups having from 1 to 6 carbon atoms. The silicon compound (ii) acts as a crosslinker for the diorganopolysiloxane by reacting with the functionality of the latter. It is further preferred that the above diorganopolysiloxane is either a linear or a branched polymer or copolymer of siloxane units selected from dimethylsiloxane units, methylphenylsiloxane units or methyltrifluoropropylsiloxane units. Most preferably, the diorganopolysiloxane of component (A) is a polydimethylsiloxane containing Si-bonded hydroxyl or methoxy functionality. The above mentioned silicon compound (ii) is preferably a siloxane resin comprising $(CH_3)_3SiO_{1/2}$ and $SiO_2$ units and having a molar ratio of $(CH_3)_3SiO_{1/2}/SiO_2$ between 0.4:1 and 1.2:1. The latter resin may be prepared according to methods taught in, e.g., U.S. Pat. No. 2,676,182 to Daudt et al. and typically contains from about 0.5 to about 3 weight percent of hydroxyl groups.

A highly preferred component (I) is a homogeneous blend of a hydroxyl-terminated polydimethylsiloxane, a trimethylsilyl-terminated polydimethylsiloxane having a viscosity in the range of about 1,000 to 50,000 $mm^2/s$ at 25° C., an alkyl polysilicate wherein the alkyl group has one to five carbon atoms, such as methyl polysilicate, ethyl polysilicate and propyl polysilicate, and a potassium silanolate catalyst reacted at a temperature of 50 to 300° C.

Component (II) is mineral oil. The term "mineral oil" as used herein refers to hydrocarbon oils derived from carbonaceous sources, such as petroleum, shale, and coal, and equivalents thereof. The mineral oil of component (II) can be any type of mineral oil, many of which are commercially available, including heavy white mineral oil which is high in paraffin content, light white mineral oil, petroleum oils such as aliphatic or wax-base oils, aromatic or asphalt-base oils, or mixed base oils, petroleum derived oils such as lubricants, engine oils, machine oils, or cutting oils, and medicinal oils such as refined paraffin oil. The above mentioned mineral oils are available commercially at a variety of viscosities from Amoco Chemical Company (Chicago, Ill.) under the tradename Amoco White Mineral Oil, from Exxon Company (Houston, Tex.) under the tradenames Bayol™, Marcol™, or Primol™, or from Lyondell Petrochemical Company (Houston, Tex.) under the trade name Duoprime® Oil. Preferably the mineral oil has a viscosity of from about 5 to about 20 millipascal-seconds at 25° C.

For the purposes of the present invention, the weight ratio of component (I) to component (II) can generally range from about 99:1 to about 40:60, and more preferably from about 90:10 to about 50:50.

The dispersible silicone compositions of the present invention may further comprise component (III) a finely divided filler, as described above for component (iv). Specific examples of this filler include zirconium silica hydrogels (co-precipitated zirconium and silica) and hydrophobic precipitated silica, the latter being highly preferred. The amount of finely divided filler, component (III), to be added generally ranges from about 1 to 15 parts by weight, said parts by weight being based on the total weight of the composition.

The dispersible silicone compositions of the present invention may further comprise component (IV) a polyorganosiloxane of the type described for component (i), supra.

Preferred polyorganosiloxanes in this regard are selected from the same trimethylsilyl-terminated polydimethylsiloxanes described for the preferred embodiments for (A) and the hydroxyl-terminated polydimethylsiloxanes for (B) of component (i), supra. For Component (IV), the preferred viscosity ranges of the polyorganosiloxanes of (A) and (B) are 2 to 100 mm$^2$/s and 5 to 100,000 mm$^2$/s, respectively. Particularly preferred viscosity ranges of these components are 10 to 50 mm$^2$/s for (A) and 10 to 100 mm$^2$/s for (B), the above viscosities being measured at 25° C. The amount of component (IV) to be added generally ranges from about 10 to 100 parts by weight, said parts by weight being based on the total weight of the composition.

The dispersible silicone compositions of the present invention can also comprise component (V) a saturated or unsaturated bisamide such as those disclosed in U.S. Pat. No. 4,107,073, incorporated herein by reference to teach bisamides which are suitable for use in the compositions of this invention. Preferred bisamides are those having the formula RC(O)N(H)—(CH$_2$)$_n$—N(H)C(O)R where n is an integer from 1 to 6, and R is a saturated or unsaturated, straight or branched chain hydrocarbyl group having from 5 to 22 carbon atoms. Particularly preferred as the bisamide is ethylene bis-stearamide. The amount of bisamide (V) to be used in the compositions is generally at about 0.01 to about 5 parts by weight per 100 parts by weight of mineral oil, and preferably is at about 0.01 to 2 parts by weight per 100 parts by weight of mineral oil.

In addition to the above mentioned components, the dispersible silicone compositions of the present invention may also contain adjuvants such as corrosion inhibitors and dyes. The compositions of the present invention may be prepared by blending components (I) and (II), and any optional components, to form a homogenous mixture. This may be accomplished by any convenient mixing method known in the art such as a spatula, mechanical stirrers, in-line mixing systems containing baffles, blades, or any of the like mixing surfaces including powered in-line mixers or homogenizers, a drum roller, a three-roll mill, a sigma blade mixer, a bread dough mixer, and a two roll mill. Although the order of mixing is not considered critical, it is preferred to first mix components (I) and (II) and then disperse the finely divided filler (III) in this combination by using a high shear mixer, and then optionally adding polyorganosiloxane (IV). It is also preferred that components (I) and (II), and optionally (III) and/or (IV) be first blended to together and then adding, if desired, bisamide (V).

The present invention also relates to a process for controlling foam in a foaming system wherein the above-described dispersible silicone compositions may simply be added to a foaming or foam-producing system, in an amount sufficient to reduce foaming, as determined by routine experimentation. Typically, the dispersible silicone compositions of the present invention are added at a concentration of about 0.001 to 0.1 parts by weight based on the weight of the foaming system, however the skilled artisan will readily determine optimum concentrations after a few routine experiments. The method of addition is not critical, and the composition may be metered in or added by any of the techniques known in the art. Examples of foaming systems contemplated herein include media encountered in the production of phosphoric acid and in sulphite or sulphate process pulping operations, bauxite digestion medium in the production of aluminum, metal working fluids, paper manufacture, detergent systems, hydrocarbon based systems, etc. The compositions of the present invention can be used as any kind of foam control composition, i.e. as defoaming compositions and/or antifoaming compositions. Defoaming compositions are generally considered as foam reducers whereas antifoaming compositions are generally considered as foam preventors. The compositions of this invention find utility as foam control compositions in various media such as inks, coatings, paints, detergents, pulp and paper manufacture, textile dyes, and hydrocarbon containing fluids.

EXAMPLES

All parts and percentages in the examples are on a weight basis unless indicated to the contrary. All viscosities were measured on a Brookfield Viscometer. The following materials were employed in the preparation of the dispersible silicone compositions:

Silicone composition A was prepared according to method disclosed in Example 1 of Aizawa et al., in U.S. Pat. No. 4,639,489, cited supra. This composition contained 60 parts of a trimethylsilyl-terminated polydimethylsiloxane having a viscosity of 1,000 mm$^2$/s at 25° C.; 29 parts of a hydroxyl-terminated polydimethylsiloxane having a viscosity of 12,500 mm$^2$/s at 25° C.; 2.9 parts of ethyl polysilicate ("Silicate 45" of Tama Kagaku Kogyo Co., Ltd., Japan); 4.8 parts of a potassium silanolate catalyst; 2.9 parts of Aerogel #200 silica (Nippon Aerogel Co., Japan) having a surface area of 200 m$^2$/g; and 4.8 parts of hydroxyl-terminated polydimethylsiloxane having a viscosity of 40 mm$^2$/s at 25° C. In addition to the above ingredients, this formulation also included 0.3 parts of ethanol as part of the catalyst, 0.1 part water adsorbed on the silica and 0.1 part of L-540, added as a process dispersant. L-540 (Union Carbide Corp., Danbury, Conn.) is described as a silicone polyether block copolymer wherein the polyether blocks consist of 50/50 mole percent of polyoxyethylene/polyoxypropylene.

Mineral Oil A is Duoprime® Oil 55, a white mineral oil having a viscosity of about 10 millipascal-seconds at 25° C. from Lyondell Petrochemical Company (Houston, Tex.).

Mineral Oil B is Duoprime® Oil 90, a white mineral oil having a viscosity of about 23 millipascal-seconds at 25° C. from Lyondell Petrochemical Company (Houston, Tex.).

Mineral Oil C is Duoprime® Oil 200, a white mineral oil having a viscosity of about 74 millipascal-seconds at 25° C. from Lyondell Petrochemical Company (Houston, Tex.).

Mineral Oil D is Duoprime® Oil 500, a white mineral oil having a viscosity of about 189 millipascal-seconds at 25° C. from Lyondell Petrochemical Company (Houston, Tex.).

Mineral Oil E is a heavy paraffinic mineral oil having a viscosity of about 177 millipascal-seconds (mPa.s) at 25° C. from Fisher Scientific Company (Pittsburgh, Pa.).

Mineral Oil F is a mineral oil having a viscosity of about 10–40 millipascal-seconds (mPa.s) at 40° C.

Example 1

Silicone Composition A was mixed with Mineral Oil E in the following respective proportions, the proportion being that of Silicone Composition A to Mineral Oil E: 30/70, 40/60, 50/50, 60/40, and 70/30. After setting for 48 hours at 25° C., all these blends had separated two distinct layers.

Example 2

Several samples were prepared by mixing Silicone composition A and a series of white mineral oils having a viscosity range of 10 to 189 millipascal-seconds were mixed until a uniform consistency was achieved. Sample 1 was mixture of mineral oil A and Silicone composition A.

Samples 2–4 were mixtures of Silicone Composition A with higher viscosity mineral oils. After 24 hours at 25° C., the samples were inspected to determine if they were still uniform, stable mixtures. The results in TABLE 1 show that only those blends using Mineral Oil A remained stable.

TABLE 1

| | | WEIGHT RATIO OF SILICONE TO OIL | | | |
|---|---|---|---|---|---|
| SAMPLE | MINERAL OIL | 70/30 | 60/40 | 50/50 | 40/60 |
| 1 | A | STABLE | STABLE | STABLE | STABLE |
| 2 | B | 2 PHASES | 2 PHASES | 2 PHASES | 2 PHASES |
| 3 | C | 2 PHASES | 2 PHASES | 2 PHASES | 2 PHASES |
| 4 | D | 2 PHASES | 2 PHASES | 2 PHASES | 2 PHASES |

Sample 1 was then placed in a 40° C. oven and monitored six weeks for any sign of separation. No separation of phases or change in appearance was noted.

Example 3

Silicone Composition A and Mineral Oil A were formulated into foam control compositions.

Foam Control Composition 1 was prepared by mixing 11.02 grams of 50/50 parts by weight mixture of Silicone Composition A with Mineral Oil A, 54.00 grams of Mineral Oil E, 20.00 grams of a 10% by weight dispersion of ethylene bis-stearamide in Mineral Oil F, and 15.07 grams of a 20% by weight dispersion of hydrophobic silica in Mineral Oil F.

Foam Control Composition 2 was prepared by mixing 9.02 grams of a 60/40 parts by weight mixture of Silicone Composition A and Mineral Oil A, 55.00 grams of Mineral Oil E, 20.00 grams of a 10% by weight dispersion of ethylene bis-stearamide in Mineral Oil F, and 15.02 grams of a 20% by weight dispersion of hydrophobic silica in Mineral Oil F.

Foam Control Composition 3 was prepared by mixing 7.90 grams of a 70/30 parts by weight mixture of Silicone Composition A and Mineral Oil A, 57.01 grams of Mineral Oil E, 20.00 grams of a 10% by weight dispersion of ethylene bis-stearamide in Mineral Oil F, and 15.02 grams of a 20% by weight dispersion of hydrophobic silica in Mineral Oil F.

Comparative Foam Control Composition 1 was a composition in which no blend of the present invention was used in the foam control composition. The level of ethylene bis-stearamide and hydrophobic silica was unchanged from that used in Foam Control Compositions 1–3. Mineral Oil E was again used, but its amount was increased to compensate for the lack of the presence of the silicone composition. Thus, 65.01 grams of Mineral Oil E was mixed at room temperature with 20.00 grams of a 10% by weight dispersion of ethylene bis-stearamide in Mineral Oil F, and 15.00 grams of a 10% wt dispersion of hydrophobic silica in Mineral Oil F.

The Foam Control Compositions described above were tested for their capacity to reduce or eliminate foaming in a recirculating pump test. In this test, 400 cc of Kraft pulp black liquor (the liquor comprised sodium lignin sulfonate, pentosan sugars, tall oil soaps, sodium carbonate, sodium sulfide and sodium hydroxide dissolved in water with a solids content of about 15% and a pH of 13.5 at 20° C.) was circulated with Nitrogen injected into the liquor stream to maximize foaming. The liquid volume in the test unit is set at 14 cm of height within the vertical column in which foam rise is measured. At the start of the test, which is conducted at 177° F, the foam column is allowed to rise to a height of 21 cm. At that point, 100 ul of one of the foam control compositions described above is injected by a syringe into the recirculating liquor stream. Foam height as a function of time is then monitored and recorded. Table 2 hereinbelow shows the results of the tests.

TABLE 2

| | | Foam Control | Foam Height (cm) at | | |
|---|---|---|---|---|---|
| Foam Control Composition | Silicone (ppm) | Composition (ppm) | 15 sec. | 2.5 min. | 5* min. |
| 1 | 13.1 | 237.5 | 14.0 | 18.0 | 272 |
| 2 | 13.1 | 237.5 | 13.0 | 18.5 | 256 |
| 3 | 13.1 | 237.5 | 14.0 | 18.0 | 252 |
| Compar. #1 | 0.0 | 237.5 | 28.0 | >32 | >32 |

*sum total of foam height readings up to 5 min. of test time.

Example 4

A silicone composition containing 91 parts of 350 to 1000 $mm^2/s$ polydimethylsiloxane fluid, 3 parts of a short chain hydroxy-endblocked polydimethylsiloxane fluid, and 6 parts of fumed silica was made into a silicone compound using base catalysis. This composition was blended with mineral oils of varying viscosities. After 24 hours, only those made with Mineral Oil A wherein the amount of Mineral Oil A does not exceed 50 parts by weight of the blend were homogeneous and one phase. All others had separated into two phases. The results of this test are shown in Table 3 below where the number 1 indicates it was 1 phase and the number 2 indicates 2 phases.

TABLE 3

| | | WEIGHT RATIO OF SILICONE TO OIL | | | | | | |
|---|---|---|---|---|---|---|---|---|
| SAM-PLE | MINERAL OIL | 90/10 | 70/30 | 60/40 | 50/50 | 40/60 | 30/70 | 10/90 |
| 5 | A | 1 | 1 | 1 | 2 | 2 | 2 | 2 |
| 6 | B | 2 | 2 | 2 | 2 | 2 | 2 | 2 |
| 7 | C | 2 | 2 | 2 | 2 | 2 | 2 | 2 |
| 8 | D | 2 | 2 | 2 | 2 | 2 | 2 | 2 |

Example 5

Sample 9 was prepared by blending Silicone Composition A with a polydimethylsiloxane having a viscosity of about 1000 $mm^2/s$ and a hydroxy end-blocked polydimethylsiloxane having a viscosity of about 70 $mm^2/s$ at a weight ratio of about 1.2:1.2:1.0, respectively. This silicone mixture was then blended with Mineral Oil A.

Sample 10 was prepared according to Sample 9, except that Mineral Oil B replaced Mineral Oil A. Both were allowed to stand for 48 hours at room temperature and their appearance evaluated. Sample 9 remained a one phase material with no significant separation of the components. Sample 10 on the other hand had separated into two distinct phases in roughly the same volume proportions as the original amounts of silicone and mineral oil that were mixed.

That which is claimed is:

1. A method for controlling foam in a foam producing system comprising adding to the foam producing system a dispersible silicone composition comprising a blend of:
   (I) a silicone composition prepared by reacting at a temperature of 50° C. to 300° C. a mixture comprising:
      (i) 100 parts by weight of at least one polyorganosiloxane selected from
         (A) a polyorganosiloxane having a viscosity of about 20 to 100,000 mm²/s at 25° C. and being expressed by the general formula $R^1_a SiO_{(4-a)/2}$ in which $R^1$ is a monovalent hydrocarbon or halogenated hydrocarbon group having 1 to 10 carbon atoms and a has an average value of 1.9 to 2.2,
         (B) a polyorganosiloxane having a viscosity of 200 to about 100 million mm²/s at 25° C. expressed by the general formula $R^2_b(R^3O)_c SiO_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of 1.9 to 2.2 and c has a sufficiently large value to give at least one —$OR^3$ group in each molecule, at least one such —$OR^3$ group being present at the end of the molecular chain, or
         (C) a mixture of (A) and (B);
      (ii) 0.5 to 20 parts by weight of at least one silicon compound selected from
         (a) an organosilicon compound of the general formula $R^4_d SiX_{4-d}$ in which $R^4$ is a monovalent hydrocarbon group having 1 to 5 carbon atoms, X is selected from a halogen atom or a hydrolyzable group and d has an average value of one or less,
         (b) a partially hydrolyzed condensate of said compound (a),
         (c) a siloxane resin comprising $(CH_3)_3SiO_{1/2}$ units and $SiO_{4/2}$ units wherein the ratio of $(CH_3)_3SiO_{1/2}$ units to $SiO_{4/2}$ units is 0.4:1 to 1.2:1, or
         (d) a condensate of said compound (c) with said compound (a) or (b); and
      (iii) a catalytic amount of a compound for promoting the reaction of components (i) and (ii); and
   (II) a hydrocarbon oil having a viscosity of 5 to 20 millipascal-seconds at 25° C.

2. A method according to claim 1, wherein polyorganosiloxane (A) is a trimethylsiloxy-terminated polydimethylsiloxane having a viscosity of about 350 to 15,000 mm²/s at 25° C.

3. A method according to claim 1, wherein polyorganosiloxane (B) is a hydroxyl-terminated polydimethylsiloxane having a viscosity of about 1,000 to 50,000 mm²/s at 25° C.

4. A method according to claim 1, wherein silicon compound (ii) is selected from ethyl polysilicate or a siloxane resin copolymer comprising $(CH_3)_3SiO_{1/2}$ units and $SiO_2$ units in a molar ratio of approximately 0.4:1 to 1.2:1, respectively.

5. A method according to claim 1, wherein the catalyst (iii) is selected from alkali metal hydroxides, alkali metal silanolates, alkali metal alkoxides, quaternary ammonium hydroxides, quaternary ammonium silanolates, quaternary phosphonium hydroxides, quaternary phosphonium silanolates, ammonium carbonate, or metal salts of organic acids.

6. A method according to claim 1, wherein the mixture of (I) further comprises up to 30 parts by weight of: (iv) at least one finely divided filler.

7. A method according to claim 1, wherein the mixture of (I) further comprises up to 20 parts by weight of: (v) a polyorganosiloxane having a viscosity of 5 to 200 mm²/s at 25° C. and being expressed by the general formula $R^6_e(R^9O)_f SiO_{(4-e-f)/2}$ in which $R^6$ is a monovalent hydrocarbon or halogenated hydrocarbon group having 1 to 10 carbon atoms, $R^9$ is hydrogen or a monovalent hydrocarbon group having 1 to 10 carbon atoms, e is from 1.9 to 2.2 and f has a sufficiently large value to give at least two —$OR^9$ groups in each molecule at the end of a molecular chain.

8. A method according to claim 6, wherein the mixture of (I) further comprises up to 20 parts by weight of: (v) a polyorganosiloxane having a viscosity of 5 to 200 mm²/s at 25° C. and being expressed by the general formula $R^6_e(R^9O)_f SiO_{(4-e-f)/2}$ in which $R^6$ is a monovalent hydrocarbon or halogenated hydrocarbon group having 1 to 10 carbon atoms, $R^9$ is hydrogen or a monovalent hydrocarbon group having 1 to 10 carbon atoms, e is from 1.9 to 2.2 and f has a sufficiently large value to give at least two —$OR^9$ groups in each molecule at the end of a molecular chain.

9. A method according to claim 7, wherein said polyorganosiloxane (v) is a hydroxyl-terminated polydimethylsiloxane having a viscosity of about 10 to 100 mm²/s at 25° C.

10. A method according to claim 8, wherein said polyorganosiloxane (v) is a hydroxyl-terminated polydimethylsiloxane having a viscosity of about 10 to 100 mm²/s at 25° C.

11. A method according to claim 1, wherein the hydrocarbon oil (II) is a white mineral oil.

12. A method according to claim 1, wherein the composition further comprises at least one component selected from (III) a finely divided filler or (IV) at least one polyorganosiloxane selected from a trimethylsilyl-terminated polydimethylsiloxane having a viscosity of about 2 to 100 mm²/s at 25° C., a trimethylsilyl-terminated polydimethylsiloxane having a viscosity of about 100 to 100,000 mm²/s at 25° C., or a hydroxyl-terminated polydiorganosiloxane polymer having a viscosity of about 5 to 100,000 mm²/s at 25° C.

13. A method according to claim 6, wherein the composition further comprises at least one component selected from (III) a finely divided filler or (IV) at least one polyorganosiloxane selected from a trimethylsilyl-terminated polydimethylsiloxane having a viscosity of about 2 to 100 mm²/s at 25° C., a trimethylsiloxy-terminated polydimethylsiloxane having a viscosity of about 100 to 100,000 mm²/s at 25° C., or a hydroxyl-terminated polydiorganosiloxane polymer having a viscosity of about 5 to 100,000 mm²/s at 25° C.

14. A method according to claim 7, wherein the composition further comprises at least one component selected from (III) a finely divided filler or (IV) at least one polyorganosiloxane selected from a trimethylsilyl-terminated polydimethylsiloxane having a viscosity of about 2 to 100 mm²/s at 25° C., a trimethylsiloxy-terminated polydimethylsiloxane having a viscosity of about 100 to 100,000 mm²/s at 25° C., or a hydroxyl-terminated polydiorganosiloxane polymer having a viscosity of about 5 to 100,000 mm²/s at 25° C.

15. A method according to claim 8, wherein the composition further comprises at least one component selected from (III) a finely divided filler or (IV) at least one polyorganosiloxane selected from a trimethylsilyl-terminated polydimethylsiloxane having a viscosity of about 2 to 100 mm²/s at 25° C., a trimethylsiloxy-terminated polydimethylsiloxane having a viscosity of about 100 to 100,000 mm²/s at 25°

C., or a hydroxyl-terminated polydiorganosiloxane polymer having a viscosity of about 5 to 100,000 mm$^2$/s at 25° C.

16. A method according to claim 1, wherein the composition further comprises (V) a saturated or unsaturated bisamide.

17. A method according to claim 6, wherein the composition further comprises (V) a saturated or unsaturated bisamide.

18. A method according to claim 7, wherein the composition further comprises (V) a saturated or unsaturated bisamide.

19. A method according to claim 8, wherein the composition further comprises (V) a saturated or unsaturated bisamide.

20. A method according to claim 1, wherein the hydrocarbon oil is selected from the group consisting of mineral oils, mineral spirits, petroleum oils, aromatic oils, asphalt-base oils, mixed base oils, petroleum derived oils, and medicinal oils.

21. A method according to claim 20, wherein the mineral oils are selected from the group consisting of heavy white mineral oils and light white mineral oils, petroleum oils are selected from the group consisting of aliphatic oils and wax-base oils, the petroleum derived oils are selected from the group consisting of petroleum spirits, ligroin, lubricants, engine oils, machine oils, and cutting oils, and the medicinal oil is a refined paraffin oil.

* * * * *